(12) United States Patent
Wang et al.

(10) Patent No.: US 7,337,712 B1
(45) Date of Patent: Mar. 4, 2008

(54) VESSEL FOR SEPARATING AND COLLECTING EXCESS OIL FROM DEEP FRIED FOODS DISPOSED THEREIN BEFORE THE SAUTEING THEREOF

(76) Inventors: Franklin Wang, 8031 Commonwealth Blvd., Bellerose, NY (US) 11426;
Rosaline K. Wang, 8031 Commonwealth Blvd., Bellerose, NY (US) 11426

( * ) Notice: Subject to any disclaimer, the term of this patent is extended or adjusted under 35 U.S.C. 154(b) by 724 days.

(21) Appl. No.: 10/790,557

(22) Filed: Mar. 1, 2004

(51) Int. Cl.
*A47J 37/00* (2006.01)
(52) U.S. Cl. ............................... 99/511; 99/495; 34/58; 210/360.1
(58) Field of Classification Search .......... 99/509–513, 99/403–418, 495, 485, 492; 210/380.1, 360.1, 210/781, 784; 366/234, 601; 16/425; 426/443, 426/478, 601; 34/58; 494/60–63, 84
See application file for complete search history.

(56) References Cited

U.S. PATENT DOCUMENTS

| | | | | |
|---|---|---|---|---|
| 2,784,500 A | * | 3/1957 | Beaumont | 34/58 |
| 3,827,985 A | * | 8/1974 | De Hann et al. | 210/179 |
| 4,090,310 A | * | 5/1978 | Koff | 34/58 |
| 4,189,850 A | * | 2/1980 | Dieterich et al. | 34/58 |
| 5,054,209 A | * | 10/1991 | Koff | 34/58 |
| 5,562,025 A | | 10/1996 | Bull et al. | |
| 5,865,109 A | | 2/1999 | Bull | |
| 5,904,090 A | | 5/1999 | Lillelund et al. | |
| 6,343,546 B2 | | 2/2002 | Ancona et al. | |
| 6,439,421 B1 | * | 8/2002 | Lin | 220/759 |
| 6,523,457 B1 | | 2/2003 | Ancono et al. | |

* cited by examiner

*Primary Examiner*—Timothy F. Simone
(74) *Attorney, Agent, or Firm*—Richard L. Miller

(57) ABSTRACT

A vessel for separating and collecting excess oil from deep fried foods disposed therein before the deep fried foods are sauted. A colander is rotatably mounted in a pot and holds the fried foods. A gear train operatively connects a motor to the colander. The motor is operatively connected to, and rotates, the colander to centrifugally force the excess oil from the deep fried foods out therefrom and collect in the pot. A handle is replaceably attached to the pot by apparatus that utilizes the weight of the handle to prevent the handle from detaching from the pot.

21 Claims, 1 Drawing Sheet

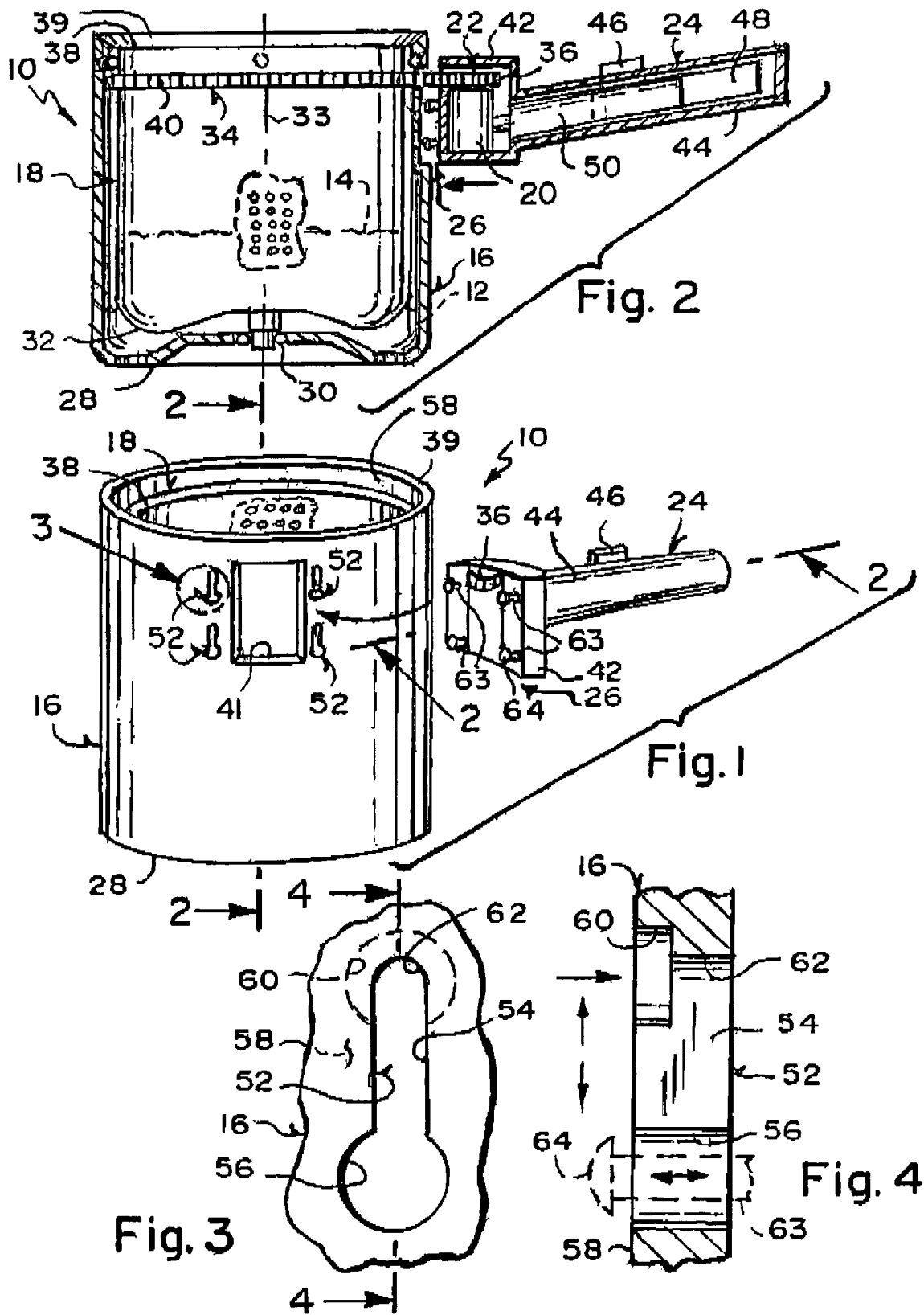

VESSEL FOR SEPARATING AND COLLECTING EXCESS OIL FROM DEEP FRIED FOODS DISPOSED THEREIN BEFORE THE SAUTEING THEREOF

BACKGROUND OF THE INVENTION

1. Field of the Invention:

The present invention relates to a vessel. More particularly, the present invention relates to a vessel for separating and collecting excess oil from deep fried foods disposed therein before the deep fried foods are sauted.

2. Description of the Prior Art:

Numerous innovations for articulating food related vessels have been provided in the prior art that will be described. Even though these innovations may be suitable for the specific individual purposes to which they address, however, they differ from the present invention.

A FIRST EXAMPLE, U.S. Pat. No. 5,562,025 to Bull et al. teaches a salad spinner comprising a bowl, a colander adapted to nest within the bowl, and a lid for the bowl and colander. Drive means are associated with the lid for rotating the colander relative to the bowl. The drive means include a handle having one end for manual engagement with the opposite end of the handle being pivotably mounted to the lid. A drive gear is positioned at the opposite end of the handle, and a turret is positioned on the underside of the lid. The turret is rotatably attached to the lid and a pinion gear is provided in driving engagement with the turret. This pinion gear meshes with the drive gear whereby movement of the handle transmits movement to the turret through the pinion gear. Drive tabes are carried by the turret for engaging the colander to impart spinning movement to the colander in response to movement of the handle.

A SECOND EXAMPLE, U.S. Pat. No. 5,865,109 to Bull teaches a drive mechanism for relatively rotatable components such as a salad spinner comprising a bowl, a colander adapted to rest within the bowl, a lid for the bowl and colander, and a drive mechanism associated with the lid and operatively connected to the colander for rotating the colander relative to the bowl. The drive mechanism includes a handle and a drive gear associated with the handle rotatably attaching the turret to the lid, a pinion gear in driving engagement with the turret, and a clutch interposed between the pinion gear and the turret. The pinion gear meshes with the drive gear whereby movement of the handle in one direction engages the clutch to transmit movement to the turret for spinning of the colander in one direction. Movement of the handle in the opposite direction disengages the clutch. The clutch comprises a clutch housing and a clutch assembly receivable within the clutch housing. The clutch assembly includes a central hub, a plurality of drive pins, flexible arms connecting the drive pins to the central hub, and tensioning petals attached to the central hub for engagement with the turret. Recesses defined by the clutch housing receive the drive pins and these recesses slope inwardly toward the central hub. An engagement surface defined by the turret is received within the clutch housing and the petals operate to move the pins inwardly along the recesses and into driving engagement with the engagement surface when the handle is moved in one direction and outwardly along the recesses and out of driving engagement when the handle is moved in the opposite directions.

A THIRD EXAMPLE, U.S. Pat. No. 5,904,090 to Lillelund et al. teaches a salad spinner having a base which receives a basket for rotation therein. A cover mounts to the base and includes a drive plate which engages the basket to drive same. The basket includes an upper edge spaced closely to the base for stability. The basket further includes one or more access depressions permitting a user to insert a finger between the basket and base. The drive plate includes one or more drive projections which abut against the access depressions, permitting these access depressions to also be used as a portion of the drive train. The cover may be inverted to an inoperative position for reduced storage space, and a storage cap may be secured to the base to store the salad spinner, for simply the contents of the base, free from contamination.

A FOURTH EXAMPLE, U.S. Pat. No. 6,343,546 B2 to Ancona et al. teaches an electric salad spinner device which is designed for ease of use and allows for efficient drying of salad greens, leafy vegetables and the like. The device comprises a base component, a generally cylindrical basket component, a generally cylindrical basket component, a scalable lid having a handle, an on/off switch and a drive motor. Optionally, the device also comprises a liquid dispenser assembly which may also be motorized to provide agitation and may also comprise a sheer assembly to allow for slicing in of hard vegetables such as, for example, cucumbers, carrots, celery and the like.

A FIFTH EXAMPLE, U.S. Pat. No. 6,523,457 B1 to Ancona et al. teaches a pasta machine that includes a housing with a removable container for holding a liquid such as water, and the housing includes a heater for heating the liquid to a boiling state. An enclosed colander having a cover and holding a food product such as pasta is disposed on the container and includes arms to allow it to rotate through the boiling water. The housing of the pasta machine includes a suitable control mechanism that controls rotation of the colander through the boiling water to cook the food product within the colander. The number of rotations and intervals between rotation are a function of the type and amount of pasta within the colander.

It is apparent that numerous innovations for articulating food related vessels have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a vessel for separating and collecting excess oil from deep fried foods disposed therein before the deep fried foods are sauted that avoids the disadvantages of the prior art.

ANOTHER OBJECT of the present invention is to provide a vessel for separating and collecting excess oil from deep fried foods disposed therein before the deep fried foods are sauted that is simple to use.

BRIEFLY STATED, STILL ANOTHER OBJECT of the present invention is to provide a vessel for separating and collecting excess oil from deep fried foods disposed therein before the deep fried foods are sauted. A colander is rotatably mounted in a pot and holds the fried foods. A gear train operatively connects a motor to the colander. The motor is operatively connected to, and rotates, the colander to centrifugally force the excess oil from the deep fried foods out therefrom and collect in the pot. A handle is replaceably attached to the pot by apparatus that utilizes the weight of the handle to prevent the handle from detaching from the pot.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a partially exploded diagrammatic perspective view of the present invention;

FIG. 2 is a diagrammatic cross sectional view taken along LINE 2-2 in FIG. 1;

FIG. 3 is an enlarged diagrammatic elevational view of the area generally enclosed by the dotted curve identified by ARROW 3 in FIG. 1; and FIG. 4 is an enlarged diagrammatic cross sectional view taken along LINE 4-4 in FIG. 3.

LIST OF REFERENCE NUMERALS UTILIZED IN THE DRAWING 10 vessel of present invention for separating and collecting excess oil 12 from deep fried foods 14 disposed therein before deep fried foods 14 are sauted
12 excess oil
14 deep fried foods
16 pot for collecting excess oil 12 from deep fried foods 14
18 colander for holding fried foods 14
20 motor for centrifugally forcing excess oil 12 from deep fried foods 14 out therefrom and collecting in pot 16
22 gear train
24 handle
26 apparatus
28 bottom of pot 16
30 bearing of pot 16
32 bottom of colander 18
33 axis of rotation of colander 18
34 driven gear of gear train 22
36 drive gear of gear train 22
38 top of colander 18
39 top of pot 16
40 ring gear of driven gear 34 of gear train 20
41 through bore through pot 16 of gear train 22
42 front portion of handle 24
44 rear potion of handle 24
46 switch on rear portion 44 of handle 24
48 battery interface contained in rear portion 44 of handle 24 for electrically communicating with at least one battery 50 for powering motor 20
50 at least one battery for powering motor 20
52 two pair of key through bores through pot 16 of apparatus 16
54 upper portion of each key through bore of two pair of key through bores 52 through pot 16 of apparatus 26
56 lower portion of each key through bore of two pair of key through bores 52 through pot 16 of apparatus 26
58 inner surface of pot 16
60 four blind bores in inner surface 58 of pot 16 of apparatus 26 of apparatus 26
62 upper extreme of upper portion 54 of each key through bore of two pair of key through bores 52 through pot 16 of apparatus 26
63 two pair of studs of apparatus 26
64 heads of two pair of studs 63 of apparatus 26

DETAILED DESCRIPTION OF THE PREFERRED EMBODIMENT

Referring now to the figures, in which like numerals indicate like parts, and particularly to FIGS. 1 and 2, the vessel of the present invention is shown generally at 10 for separating and collecting excess oil 12 from deep fried foods 14 disposed therein before the deep fried foods 14 are sauted.

The vessel 10 includes a pot 16, a colander 18, a motor 20, and a gear train 22.

The colander 18 is rotatably mounted in the pot 16, and is for holding the fried foods 14.

The motor 20 is operatively connected to the colander 18, and rotates the colander 18 relative to the pot 16 for centrifugally forcing the excess oil 12 from the deep fried foods 14 out therefrom and collecting in the pot 16.

The gear train 22 operatively connects the motor 20 to the colander 18.

The vessel 10 further comprises a handle 24. The handle 24 is replaceably attached to the pot 16.

The vessel 10 further comprises an apparatus 26. The apparatus 26 replaceably attaches the handle 24 to the pot 16.

The pot 16 has a bottom 28 and a bearing 30. The bearing 30 of the pot 16 extends centrally upwardly from the bottom 28 of the pot 16.

The colander 18 has a bottom 32. The bearing 30 of the pot 16 extends centrally to the bottom 32 of the colander 18 so as to form an axis of rotation 33 about which the colander 18 rotates in the pot 16.

The gear drive 22 comprises a driven gear 34 and a drive gear 36.

The colander 18 has a top 38, the pot 16 further has a top 39, and the gear train 22 further has the pot 16 having a through bore 41. The through bore 41 in the pot 16 extends through the pot 16, just below the top 39 of the pot 16. The driven gear 34 of the gear drive 20 is a ring gear 40 that extends horizontally and circumferentially around the colander 18, just below the top 38 of the colander 18.

The handle 24 is hollow, and has a front portion 42 and a rear portion 44. The front portion 42 of the handle 24 extends bulbously and communicatingly from the rear portion 44 of the handle 24, and is replaceably attached to the pot 16.

The rear portion 44 of the handle 24 has a switch 46 mounted thereon, and contains a battery interface 48. The battery interface 48 in the rear portion 44 of the handle 24 electrically communicates with the motor 20 through the switch 46, and is for electrically communicating with at least one battery 52 for powering the motor 20.

The motor 20 extends vertically in the front portion 42 of the handle 24, and has the drive gear 36 of the gear train 22 horizontally thereon.

The drive gear 36 of the gear train 22 passes through the through bore 41 in the pot 16, and engages the driven gear 34 of the gear train 22 so as to allow the motor 20 to rotate the colander 18 in the pot 16 when the switch 46 is activated.

The configuration of the apparatus 26 can best be seen in FIGS. 1, 3, and 4, and as such, will be discussed in reference thereto.

The apparatus 26 comprises the pot 16 having two pair of key through bores 52. The two pair of key through bores 52 through the pot 16 straddle the through bore 41 through the pot 16.

Each key through bore of the two pair of key through bores 52 through the pot 16 has an upper portion 54 and a lower portion 56.

The upper portion 54 of each key through bore of the two pair of key through bores 52 through the pot 16 is vertically elongated.

The lower portion 56 of each key through bore of the two pair of key through bores 52 through the pot 16 is circular and wider than the upper portion 54 of an associated key through bore of the two pair of key through bores 52 through the pot 16.

The pot 16 further has an inner surface 58, and the apparatus 26 further comprises the inner surface 58 of the pot 16 having four blind bores 60. Each blind bore of the four blind bores 60 in the inner surface 58 of the pot 16 is disposed concentrically with an upper extreme 62 of, and is wider than, the upper portion 54 of an associated key through bore of the two pair of key through bores 52 through the pot 16.

Each blind bore of the four blind bores 60 in the inner surface 58 of the pot 16 is circular, and has a width equal to that of the lower portion 56 of an associated key through bore of the two pair of key through bores 52 through the pot 16.

The apparatus 26 further comprises two pair of studs 63 with heads 64. The two pair of studs 63 of the apparatus 26 extend outwardly from the front portion 42 of the handle 24, terminate in the heads 64 thereof, straddle the drive gear 36 of the gear drive 22, and align with the two pair of key through bores 52 through the pot 16, respectively.

The heads 64 of the two pair of studs 63 of the apparatus 26 are larger than the upper portion 54 of the two pair of key through bores 52 through the pot 16, respectively, but smaller than the lower portion 56 of the two pair of key through bores 52 through the pot 16, respectively, so as to allow the heads 64 of the two pair of studs 63 of the apparatus 26 to pass through the lower portion 56 of the two pair of key through bores 52 through the pot 16, respectively, be lifted upwardly behind the upper portion 54 of the two pair of key through bores 52 through the pot 16, respectively, and be captured in the four blind bores 60 in the inner surface 58 of the pot 16, respectively, by virtue of the weight of the handle 24 tipping the heads 64 of the two pair of studs 63 of the apparatus 26 into the four blind bores 60 in the inner surface 58 of the pot 16, respectively, so as to prevent the heads 64 of the two pair of studs 63 of the apparatus 26 from dropping back down the two pair of key through bores 52 through the pot 16 and detaching the handle 24 from the pot 16.

It will be understood that each of the elements described above, or two or more together, may also find a useful application in other types of constructions differing from the types described above.

While the invention has been illustrated and described as embodied in a vessel for separating and collecting excess oil from deep fried foods disposed therein before the deep fried foods are sauted, however, it is not limited to the details shown, since if will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A vessel for separating and collecting excess oil from deep fried foods disposed therein before the deep fried foods are sauted, said vessel comprising:
   a) a pot;
   b) a colander;
   c) a motor; and
   d) a gear train;
   wherein said colander is rotatably mounted in said pot;
   wherein said colander is for holding the fried foods;
   wherein said motor is operatively connected to said colander;
   wherein said motor rotates said colander relative to said pot;
   wherein said motor is for centrifugally forcing the excess oil from the deep fried foods out therefrom and collecting in the pot;
   wherein said gear train operatively connects said motor to said colander;
   wherein said gear train comprises a driven gear; and
   wherein said gear train comprises a drive gear;
   wherein said colander has a top;
   wherein said pot has a top;
   wherein said gear train has said pot having a through bore;
   wherein said through bore in said pot extends through said pot;
   wherein said through bore in said pot is disposed just below said top of said pot;
   wherein said driven gear of said gear train extends horizontally around said colander;
   wherein said driven gear of said gear train extends circumferentially around said colander; and
   wherein said driven gear of said gear train is disposed just below said top of said colander.

2. The vessel as defined in claim 1; further comprising a handle; and
   wherein said handle is replaceably attached to said pot.

3. The vessel as defined in claim 2; further comprising an apparatus; and
   wherein said apparatus replaceably attaches said handle to said pot.

4. The vessel as defined in claim 2, wherein said handle is hollow.

5. The vessel as defined in claim 1, wherein said pot has a bottom;
   wherein said pot has a bearing;
   wherein said bearing of said pot extends centrally from said bottom of said pot; and
   wherein said bearing of said pot extends upwardly from said bottom of said pot.

6. The vessel as defined in claim 5, wherein said colander has a bottom;
   wherein said bearing of said pot extends centrally to said bottom of said colander so as to form an axis of rotation; and
   wherein said axis of rotation is about which said colander rotates in said pot.

7. The vessel as defined in claim 1, wherein said driven gear of said gear train is a ring gear.

8. The vessel as defined in claim 7, wherein said handle has a front portion;

wherein said handle has a rear portion;

wherein said front portion of said handle extends bulbously from said gear portion of said handle;

wherein said front portion of said handle extends coomunicatingly from said rear portion of said handle; and wherein said front portion of said handle is replaceably attached to said pot.

9. The vessel as defined in claim 8, wherein said rear portion of said handle has a switch mounted thereon;

wherein said rear portion of said handle contains a battery interface;

wherein said battery interface in said rear portion of said handle electrically communicates with said motor through said switch; and wherein said battery interface in said rear portion of said handle is for electrically communicating with at least one battery for powering said motor.

10. The vessel as defined in claim 9, wherein said drive gear of said gear train passes through said through bore in said pot; and wherein said drive gear of said gear train engages said driven gear of said gear train so as to allow said motor to rotate said colander in said pot when said switch is activated.

11. The vessel as defined in claim 8, wherein said motor extends vertically in said front portion of said handle; and wherein said motor has said drive gear of said gear train horizontally thereon.

12. The vessel as defined in claim 8, wherein said apparatus comprises said pot having two pair of key through bores.

13. The vessel as defined in claim 12, wherein said two pair of key through bores through said pot straddle said through bore through said pot.

14. The vessel as defined in claim 12, wherein each key through bore of said two pair of key through bores through said pot has an upper portion; and wherein each key through bore of said two pair of key through bores through said pot has a lower portion.

15. The vessel as defined in claim 14, wherein said upper portion of each key through bore of said two pair of key through bores through said pot is vertically elongated.

16. The vessel as defined in claim 14, wherein said lower portion of each key through bore of said two pair of key through bores through said pot is circular; and wherein said lower portion of each key through bore of said two pair of key through bores through said pot is wider than said upper portion of an associated key through bore of said two pair of key through bores through said pot.

17. The vessel as defined in claim 14, wherein said pot has an inner surface; and wherein said apparatus comprises said inner surface of said pot having four blind bores.

18. The vessel as defined in claim 17, wherein each blind bore of said four blind bores in said inner surface of said pot is disposed concentrically with an upper extreme of said upper portion of an associated key through bore of said two pair of key through bores through said pot; and wherein each blind bore of said four blind bores in said inner surface of said pot is wider than said upper portion of an associated key through bore of said two pair of key through bores through said pot.

19. The vessel as defined in claim 17, wherein each blind bore of said four blind bores in said inner surface of said pot is circular; and wherein each blind bore of said four blind bores in said inner surface of said pot has a width equal to that of said lower portion of an associated key through bore of said two pair of key through bores through said pot.

20. The vessel as defined in claim 17, wherein said apparatus comprises two pair of studs;

wherein said two pair of studs of said apparatus has heads;

wherein said two pair of studs of said apparatus extend outwardly from said front portion of said handle;

wherein said two pair of studs of said apparatus terminate in said heads thereof;

wherein said two pair of studs of said apparatus straddle said drive gear of said gear drive; and wherein said two pair of studs of said apparatus align with said two pair of key through bores through said pot, respectively.

21. The vessel as defined in claim 20, wherein said heads of said two pair of studs of said apparatus are larger than said upper portion of said two pair of key through bores through said pot, respectively, but smaller than said lower portion of said two pair of key through bores through said pot, respectively, so as to allow said heads of said two pair of studs of said apparatus to pass through said lower portion of said two pair of key through bores through said pot, respectively, be lifted upwardly behind said upper portion of said two pair of key through bores through said pot, respectively, and be captured in said four blind bores in said inner surface of said pot, respectively, by virtue of the weight of said handle tipping said heads of said two pair of studs of said apparatus into said four blind bores in said inner surface of said pot, respectively, so as to prevent said heads of said two pair of studs of said apparatus from dropping back down said two pair of key through bores through said pot and detaching said handle from said pot.

* * * * *